(12) United States Patent
Varble et al.

(10) Patent No.: US 9,667,753 B2
(45) Date of Patent: May 30, 2017

(54) FIBRE CHANNEL GATEWAY SYSTEM

(71) Applicant: Dell Products L.P., Round Rock, TX (US)

(72) Inventors: T. Bryan Varble, Round Rock, TX (US); Jeffrey S. Kirk, Austin, TX (US); Jason Garth Pearce, Round Rock, TX (US); Kevin Allen Hughes, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 14/295,999

(22) Filed: Jun. 4, 2014

(65) Prior Publication Data

US 2015/0358202 A1  Dec. 10, 2015

(51) Int. Cl.
| | |
|---|---|
| *H04L 12/24* | (2006.01) |
| *H04L 29/06* | (2006.01) |
| *H04L 12/721* | (2013.01) |
| *H04L 12/931* | (2013.01) |
| *H04L 29/08* | (2006.01) |

(52) U.S. Cl.
CPC .......... *H04L 69/08* (2013.01); *H04L 41/0226* (2013.01); *H04L 67/1097* (2013.01)

(58) Field of Classification Search
CPC .............................. H04L 41/0226; H04L 69/08
See application file for complete search history.

(56) References Cited

U.S. PATENT DOCUMENTS

| | | | |
|---|---|---|---|
| 2008/0056300 A1* | 3/2008 | Williams | H04L 12/4633 370/466 |
| 2009/0052346 A1* | 2/2009 | Brown | H04L 49/35 370/254 |
| 2012/0127903 A1* | 5/2012 | Estevez | H04W 52/0209 370/311 |
| 2014/0029623 A1* | 1/2014 | Hernandez | H04L 61/103 370/395.53 |

* cited by examiner

*Primary Examiner* — Yemane Mesfin
*Assistant Examiner* — Henry Baron
(74) *Attorney, Agent, or Firm* — Haynes and Boone, LLP

(57) ABSTRACT

An information handling system (IHS) network includes a server IHS and a Fiber Channel (FC) switch IHS that are each directly connected a FC gateway. The FC gateway is configured to establish communication with the FC switch IHS. The FC gateway then receives one of an FCoE Initialization Protocol (FIP) fabric login message and a FIP fabric discovery message from the server IHS and, in response, provides a FCoE fabric discovery message and converts the FCoE fabric discovery message to an FC fabric discovery message that is provided to the FC switch IHS. The FC gateway also receive a FC fabric discovery accept message from the FC switch IHS, converts the FC fabric discovery accept message to an FCoE fabric discovery accept message, and provides one of a FIP fabric login accept message and a FIP fabric discovery accept message to the server IHS.

17 Claims, 8 Drawing Sheets

FIBRE CHANNEL GATEWAY SYSTEM

BACKGROUND

The present disclosure relates generally to information handling systems (IHSs), and more particularly to Fibre Channel gateway system for providing a direct Fibre Channel connection to a Fibre Channel storage area network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs including, for example, server IHSs such as blade servers, may be housed in a chassis enclosure such as, for example, the PowerEdge M1000e blade enclosure available from Dell Inc. of Round Rock, Tex. In some situations, it is desirable to connect those server IHSs to Fibre Channel storage area networks (SANs). Conventionally, converged network adapters on the server IHSs that utilize Fibre Channel over Ethernet (FCoE) communications must be connected to the SAN fabric via proprietary converged Ethernet switches and, in some cases, FCoE transit switches as well, both options of which suffer from a number of drawbacks.

Conventional proprietary converged Ethernet switches typically include an Ethernet switch Application Specific Integrated Circuit (ASIC) connected to a Fibre Channel switch ASIC by a connectivity Field Programmable Gate Array (FPGA). The Ethernet switch ASIC and the Fibre Channel switch ASIC must each be provided their own operating systems and must be configured with separate, different, and distinct command line interfaces. The use of two ASICs and an FPGA, along with other features of conventional proprietary converged Ethernet switches, increases the complexity and the cost of connecting the server IHSs to the SAN. Conventional FCoE transit switches provide a FCoE initialization protocol (FIP) snooping bridge or Front Side Bus (FSB) that does not provide native Fibre Channel at the chassis enclosure, still requires a converged Ethernet switch (such as those discussed above) with a Fibre Channel Forwarder (FCF) on the uplink ports, and introduce another hop in the FCoE path such that the system is subject to problems including head of line blocking, nondeterministic paths, nondeterministic impact of PAUSE/PFC across the PAUSE domains, and a variety of other multi-hop FCoe problems known in the art.

Accordingly, it would be desirable to provide an improved Fibre Channel gateway system.

SUMMARY

According to one embodiment, an information handling system (IHS) network includes a server IHS; a Fibre Channel (FC) switch IHS; and a FC gateway that is directly connected to each of the server IHS and the FC switch IHS, wherein the FC gateway is configured to: establish communication with the FC switch IHS; receive one of an FCoE Initialization Protocol (FIP) fabric login message and a FIP fabric discovery message from the server IHS and, in response, provide a FCoE fabric discovery message and convert the FCoE fabric discovery message to an FC fabric discovery message that is provided to the FC switch IHS; and receive a FC fabric discovery accept message from the FC switch IHS, convert the FC fabric discovery accept message to an FCoE fabric discovery accept message, and provide one of a FIP fabric login accept message and a FIP fabric discovery accept message to the server IHS.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
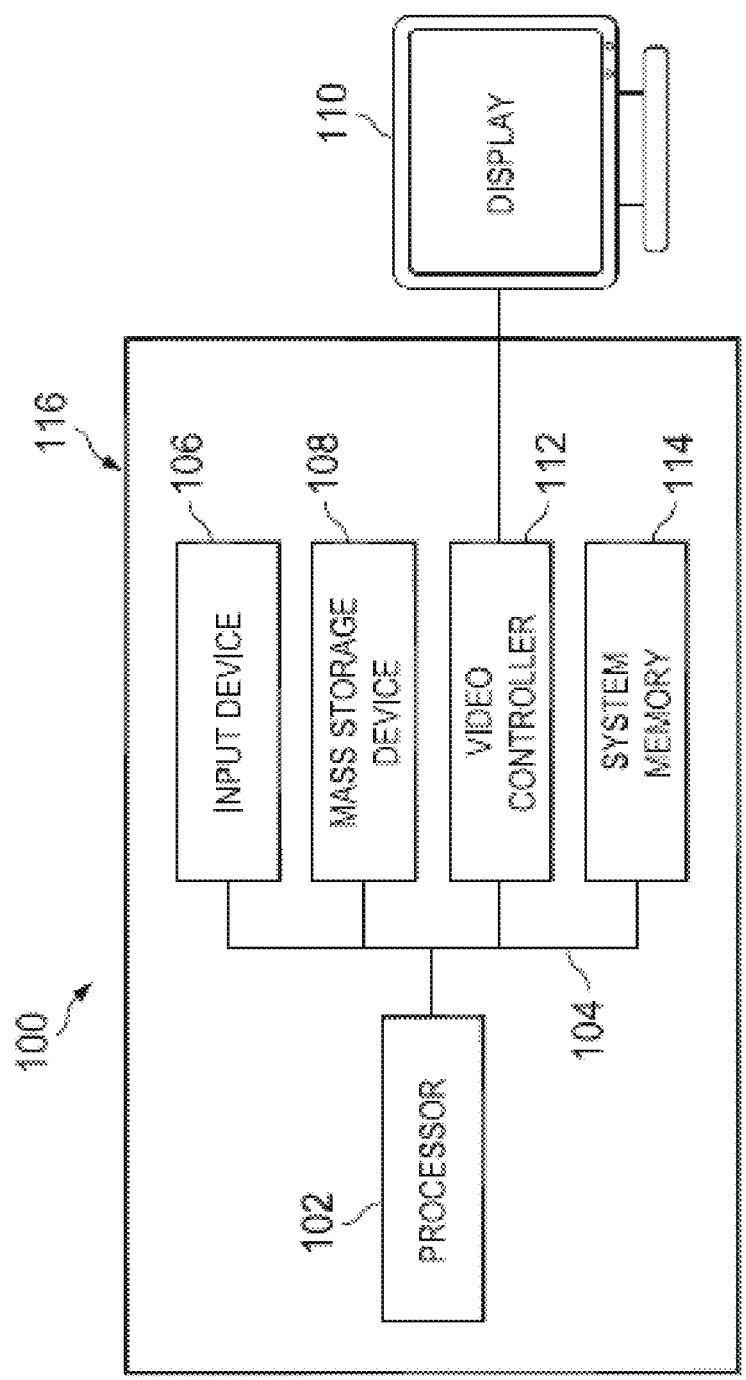
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
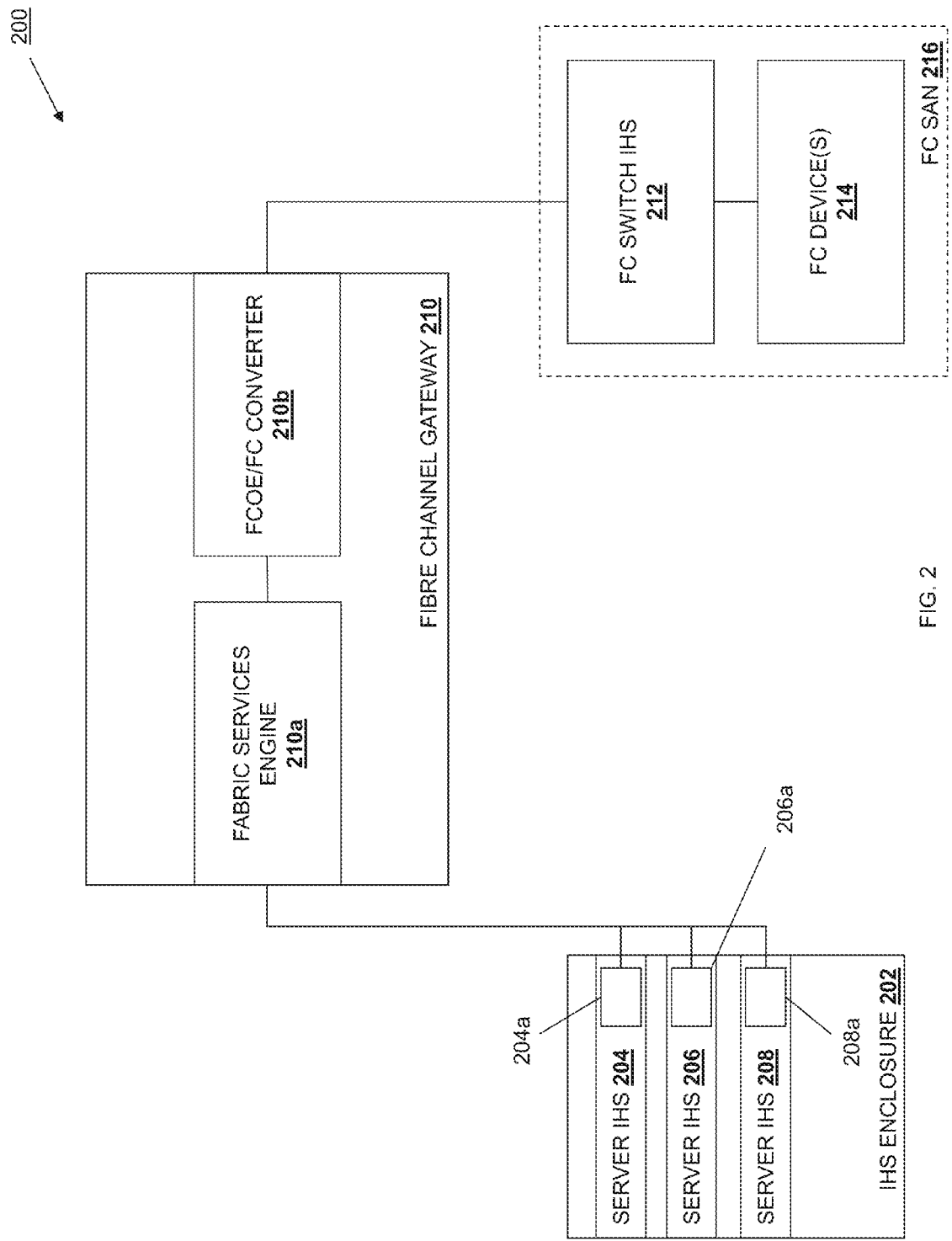
FIG. 2 is a schematic view illustrating an embodiment of a Fibre Channel Gateway System.

Referring now to FIG. 2, an embodiment of a Fibre Channel (FC) gateway system 200 is illustrated. The FC gateway system 200 includes an IHS enclosure 202 that houses a plurality of server IHSs 204, 206, and 208. In an embodiment, the IHS enclosure 202 may be a PowerEdge M1000e blade enclosure available from Dell Inc. of Round Rock, Tex., and the server IHSs 204, 206, and 208 may be blade servers. However, a wide variety of different types of IHS enclosures and IHS's are envisioned as falling within the scope of the present disclosure. In the illustrated embodiment, each of the server IHSs 204, 206, and 208 includes a respective converged network adapter 204*a*, 206*a*, and 208*a*, that is directly connected to an FC gateway 210 that is further directly connected to an FC switch IHS 212 that is coupled to one or more FC devices 214. In an embodiment, the direct connection of the server IHSs 204, 208, and 208 to the FC gateway 210 may be provided by an Ethernet cable directly connected to Ethernet ports on the server IHSs 204, 206, and 208 and Ethernet ports on the FC gateway 210, an Ethernet connection through a backplane, and/or using a variety of other direct connection methods known in the art. While a direct connection between the server IHSs 204, 206, and 208 and the FC Gateway 210 operates to avoid a variety of Quality of Server (QoS) issues in the FC gateway system 200, in other embodiment, the server IHSs 204, 206, and 208 may be connected to the FC Gateway 210 by one or more other components such as, for example, a switch IHS. In an embodiment, the direct connection of the FC gateway 210 and the FC switch IHS 212 may be provided by an FC cable directly connected to FC ports on the FC gateway 210 and FC ports on the FC switch IHS 212, an FC connection through a backplane, and/or using a variety of other direct connection methods known in the art.

In an embodiment, the FC gateway 210 may be an Input/Output IHS that may include some or all of the components of the IHS 100 discussed above with reference to FIG. 1. While illustrated as separate from the IHS enclosure 202 for clarity of illustration and discussion, in some embodiments, the FC gateway 210 may be located in the IHS enclosure 202. In the illustrated embodiment, a memory system in the FC gateway 210 (e.g., the system memory 114 discussed above with reference to FIG. 1) may include instructions that, when executed by a processing system (e.g., the processor 102 discussed above with reference to FIG. 1), cause the processing system provide a fabric services engine 210*a* that is configured to perform any of the functionality of the fabric services engines discussed below. In some embodiments, the fabric services engine 210*a* may be referred to as an "essential" fabric services engine that provides for only the essential fabric services needed to enable the FC gateway 210, which may include, for example, the sending of fabric discovery request messages to the login server (e.g., using Well Known Address—0xFF:FF:FE), the sending of fabric login request messages to the login server (e.g., using Well Known Address—0XFF:FF:FE), etc. However, in other embodiments, the fabric services engine 210*a* may provide any of a variety of fabric services known in the art. In one example, the processing system that provides the fabric services engine 210*a* may be an Ethernet switch chip, although other processing systems are envisioned as falling within the scope of the present disclosure. The fabric services engine 210*a* may be directly connected to each of the server IHSs 204, 206, and 208 through, for example, a connection between the processing system that provides the fabric services engine 210*a* and the converged network adapters 204*a*, 206*a*, and 208*a* in the server IHSs 204, 206, and 208, respectively.

In the illustrated embodiment, the FC gateway 210 also includes a Fibre Channel over Ethernet/Fibre Channel (FCoE/FC) converter 210*b* that is connected to the fabric services engine 210*a*, and that is directly connected to the FC switch IHS 212. In an embodiment, the FCoE/FC converter 210*b* may be provided on a physical layer (PHY) chip that is included on a plugin card that is removable from the FC gateway 210. However, in other embodiments, the FCoE/FC converter 210*b* may be integrated into the FC gateway 210 such that it not (easily) removable or replaceable. In one example, the FCoE/FC converter 210*b* may include an FCoE/FC encapsulator/decapsulator at the PHY level, and as discussed in detail below may operate with the fabric services engine 210*a* to provide a direct, native FC N_Port Identity (ID) Visualization (NPIV) gateway uplink to a storage area network (SAN) 216 provided by, for example, the FC switch IHS 212 and the one or more FC devices 214. As such, the FC gateway 210 may be referred to as an FC NPIV gateway in which multiple N_Port IDs share a single physical N_Port to allow multiple FC initiators to occupy a single physical port.

In an embodiment, the FC gateway 210 is programmed to handle FCoE Initialization Protocol (FIP) data traffic (also referred to below as FIP "messages"), FIP fabric login messages, FCoE data traffic between the server IHSs 204, 206, and 208 and the FC SAN 216, and protocol translation that provides for the direct FC SAN uplink once initialization is complete. For example, the processing system (e.g., an Ethernet switch chip) that provides the fabric services engine 210*a* may include (e.g., be programmed with) learning programming such as, for example, layer 2 learning programming that allows the fabric services engine 210*a* to learn destination addresses, provide for pre-population of MAC addresses that correspond to FC Well Known Addresses (WKAs), etc. Furthermore, the processing system (e.g., an Ethernet switch chip) that provides the fabric services engine 210*a* may also include (e.g., be programmed with) all FC WKAs. Further still, the processing system (e.g., an Ethernet switch chip) that provides the fabric services engine 210*a* may also be programmed to create and handle the FCoE "wrapped" FC fabric login messages and accept messages as discussed below. Further still, a spoofed FC Forwarding (FCF) Media Access Control (MAC) address may be programmed into the FCoE/FC converter 210*b* source address with an algorithmic replacement rule that provides for the creation of Ethernet MAC addresses from FC source and/or destination addresses (FCIDs) and an FC map. The creation of Ethernet MAC addresses from FC source and/or destination addresses and an FC map using the FCoE/FC converter 210b provides for Ethernet forwarding on a standard Ethernet switch chip ("merchant" silicon) as opposed to a proprietary FC switch chip. While a few examples of the programming of the FC gateway 210 have been provided, one of skill in the art will recognize that other functionality discussed below may be programmed into the FC gateway 210 while remaining within the scope of the present disclosure. One of skill in the art in possession of the present disclosure will recognize that the FC gateway 210 provides a simpler, less expensive solution that is easier to configure and use than conventional converged Ethernet switches (sometimes in combination with FCoE transit switches), and when included in the IHS enclosure 202 provides for a direct, native FC NPIV gateway uplink from the back of the IHS enclosure 202 to the FC SAN 216.

Figure 3:
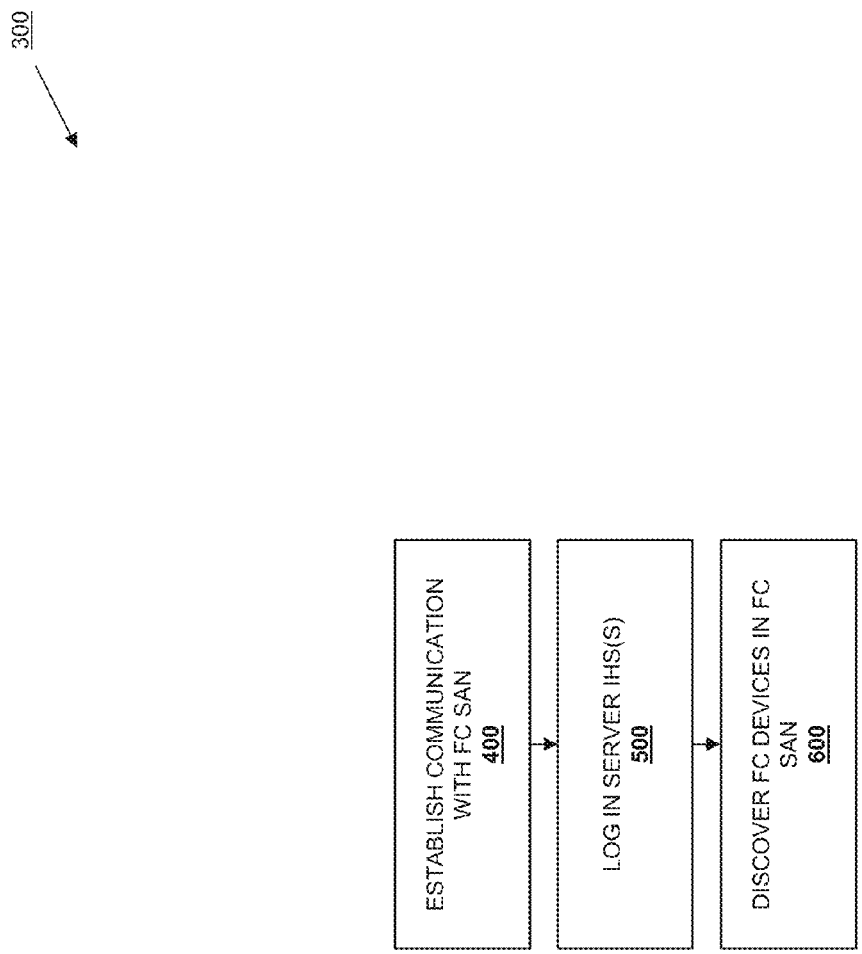
FIG. 3 is a flow chart illustrating an embodiment of a method for providing a Fibre Channel Gateway.

Referring now to FIG. 3, an embodiment of a method 300 for providing an FC gateway is illustrated that may be performed using the FC gateway system 200 discussed above with reference to FIG. 2. Each of the method blocks 400, 500, and 600 include several sub-blocks that are illustrated and described with reference to FIGS. 4, 5, and 6, respectively. However, generally, the method 300 begins at block 400 where communications are established with the FC SAN, followed by block 500 where each server IHS is logged in, and then followed by block 600 where fc devices in the FC SAN are discovered.

Figure 4:
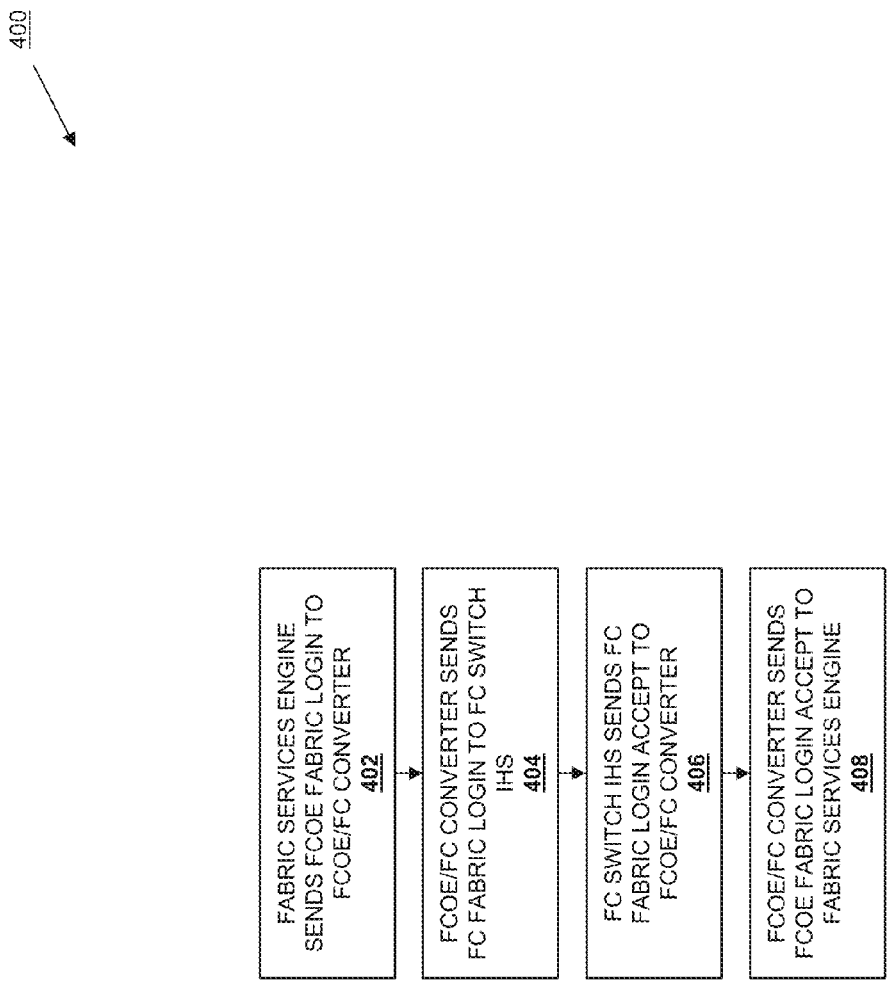
FIG. 4 is a flow chart illustrating an embodiment of a portion of the method for providing the Fibre Channel Gateway of FIG. 3.

Referring now to FIG. 4, an embodiment of block 400 of the method 300 in which communication is established with the FC SAN is illustrated. Block 400 begins with sub-block 402 where the fabric services engine sends an FCoE fabric login to the FCoE/FC converter. In an embodiment, the method 300 and/or method block 400 may begin upon connection, power up, or other initialization of the fabric gateway system 200, and following each upstream FC port on the FC gateway 210 completing initialization with the FC SAN 216 and informing the fabric services engine 210a that initialization is complete. In an embodiment of sub-block 402, the fabric services engine 210a sends an FCoE fabric login message (e.g., an FCoE FLOGI) to the FCoE/FC converter 210b for each FC port on the FC gateway 210. In an embodiment, the FCoE fabric login message sent at sub-block 402 includes a convention FC fabric login message wrapped in an FCoE header and trailer. In an embodiment, the fabric services engine 210a may use a spoofed FCF MAC address (which may have been previously programmed into the source address of the FCoE/FC converter 210b as discussed above) as its source address when communicating with the FCoE/FC converter 210b at sub-block 402 and other blocks and sub-blocks of the method 300 (e.g., a source MAC address F0:4D:A2:00:DE:XX, where XX designates a respective FC port on the FC gateway 210). For example, the fabric services engine 210a may use a source MAC address F0:4D:A2:00:DE:01 for a first FCoE fabric login message provided for a first FC port on the FC gateway 210, a source MAC address F0:4D:A2:00:DE:02 for a second FCoE fabric login message provided for a second FC port on the FC gateway 210, and so on. In an example, the FCoE fabric login message may also include a destination MAC address (e.g., 0E:FC:00:FF:FF:FE that may include an FCoE Mapped Address Prefix (FCMAP) and a Login Server WKA that is programmed into the fabric services engine 210a), a System Identification (SID) (e.g., 00:00:00, an unassigned FC identification), and a Destination Identification (DID) (e.g., FF:FF:FE, the Login Server WKA).

Block 400 then proceeds to sub-block 404 where the FCoE/FC converter sends an FC fabric login to the FC switch IHS. In an embodiment, the FCoE/FC converter 210b receives the FCoE fabric login message from the fabric services engine 210a and converts it to an FC fabric login message (e.g., an FC FLOGI) that is sent to the FC switch IHS 212. In an embodiment, the FCoE/FC converter 210b converts the FCoE fabric login message to an FC fabric login message by stripping the FCoE header and trailer from the FCoE fabric login message. In an example, the FC fabric login message may include the SID (e.g., 00:00:00, an unassigned FC identification), and the DID (e.g., FF:FF:FE, the Login Server WKA).

Block 400 then proceeds to sub-block 406 where the FC Switch IHS sends an FC fabric login accept to the FCoE converter 210b. In an embodiment, the FC switch IHS 212 receives the FC fabric login message from the FCoE/FC converter 210b and, if that FC fabric login message is accepted, replies with an FC fabric login accept message (e.g., an FC FLOGI ACC) that is sent to the FCoE converter 210b. FC switch IHS actions to determine whether an FC fabric login message is accepted are known in the art and are not discussed in further detail here. In an example, the FC fabric login accept may include an SID (e.g., FF:FF:FE, the Login Server WKA), and a DID (e.g., 03:01:01, an assigned FC identification).

Block 400 then proceeds to sub-block 408 where the FCoE/FC converter sends an FCoE fabric login accept to the fabric services engine. In an embodiment, the FCoE/FC converter 210b receives the FC fabric login accept message from the FC switch IHS 212 and converts it to an FCoE fabric login accept message (e.g., an FCoE FLOGI ACC) that is sent to the fabric services engine 210a. In an embodiment, the FCoE/FC converter 210b converts the FC fabric login accept message to an FCoE fabric login accept message by wrapping the FC fabric login accept message in an FCoE header and trailer. In an example, the FCoE fabric login accept message may include a source MAC address (e.g., F0:4D:A2:00:DE:XX, the spoofed FCF MAC address used by the fabric services engine 210a, discussed above) that is added to the FCoE fabric login accept message by the algorithmic replacement in the FCoE/FC converter 210b, as discussed above. In an example, the FCoE fabric login accept message may also include a destination MAC address (e.g., 0E:FC:00:03:01:01, which may include a Fabric Provided MAC Address (FPMA), an FCMAP, and a DID FC identification) which may be added to the FCoE fabric login accept message by algorithmic replacement in the FCoE/FC converter 210b, as discussed above. In an example, the FCoE fabric login accept message may also include a SID (e.g., FF:FF:FE, the Login Server WKA) and a DID (e.g., 03:01:01, an assigned FC identification). In an embodiment, the FCoE fabric login accept message is trapped by hardware in the FC gateway 210 and sent the fabric services engine 210a at sub-block 408.

Following sub-block 408 of block 400 of the method 300, the FC gateway 210 has established communication with the FC SAN 216 (e.g., through the communications discussed above with the FC switch IHS 212) and each of the upstream FC ports on the FC gateway 210 has logged in to the FC SAN 216. The method 300 may then proceed to block 500 where the server IHS(s) 204, 206, and 208 are logged in through their associated converged network adapters 204a, 206a, and 208a.

Figure 5:
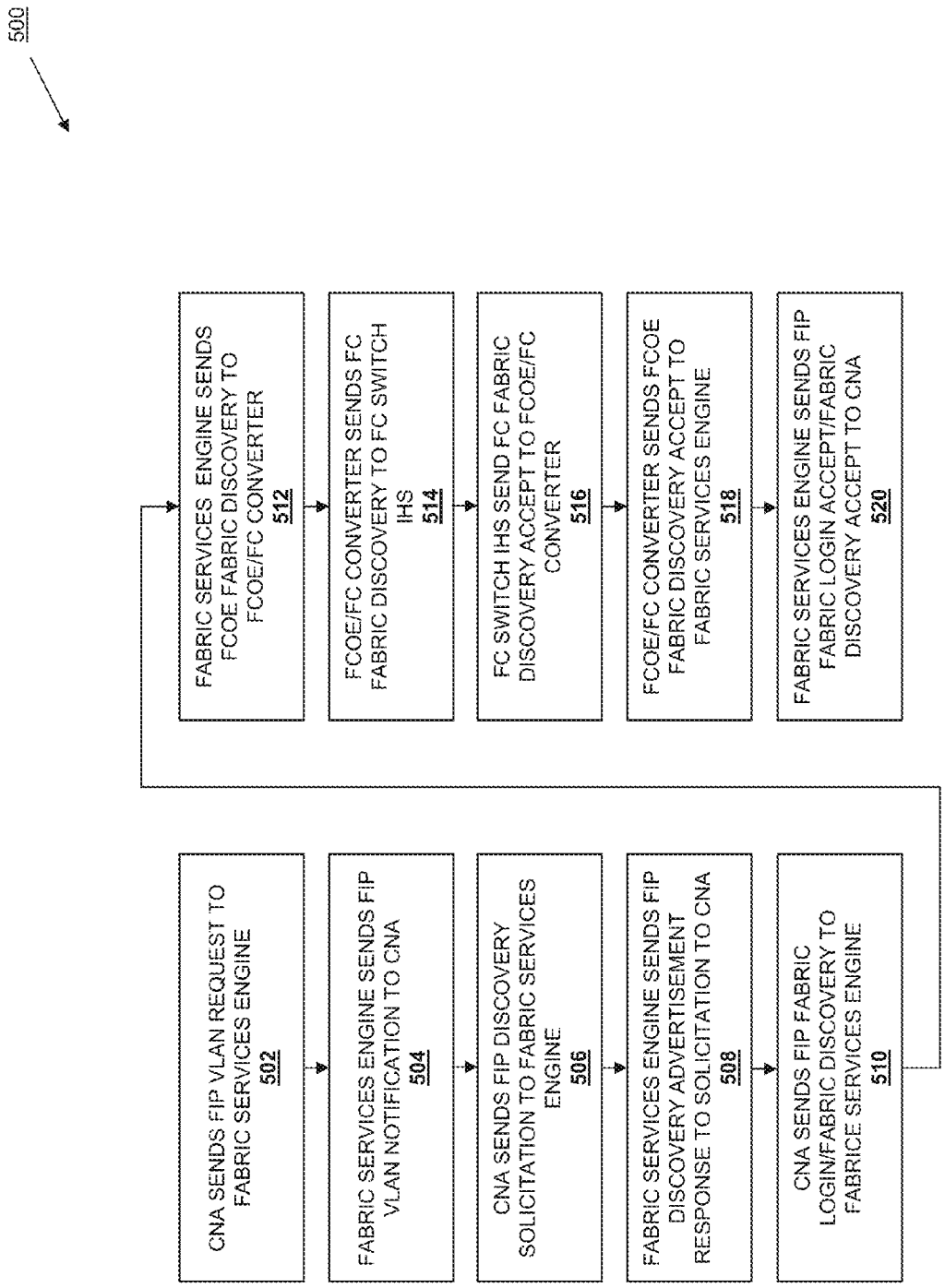
FIG. 5 is a flow chart illustrating an embodiment of a portion of the method for providing the Fibre Channel Gateway of FIG. 3.

Referring now to FIG. 5, an embodiment of block 500 of the method 300 in which server IHS(s) are logged in is illustrated. One of skill in the art in possession of the present disclosure will recognize that block 500 allows the server IHS(s) 204, 206, and 208 to log into the FC switch IHS 212, but will operate such that the server IHS(s) 204, 206, and 208 "believe" they are logging into a conventional FCF. Block 500 begins with sub-block 502 where a converged network adapter (CNA) sends an FIP Virtual Local Area Network (VLAN) request to the fabric services engine. Using the server IHS 204 and its associated CAN 204a as an example, in an embodiment, the CNA 204a sends an FIP VLAN request message to the fabric services engine 210a. In an example, the FIP VLAN request message may include a source MAC address (e.g., 00:01:02:03:04:05, A CNA ENode MAC address) and a destination MAC address (e.g., 01:10:18:01:00:02, an all-FCF-MAC-addresses address). In an embodiment, the FIP VLAN request message sent by the CNA 204a may be directed (or redirected) to the fabric services engine 210a based on its FIP Ethertype.

Block 500 then proceeds to sub-block 504 where the fabric services engine sends an FIP VLAN notification to the CNA. In an embodiment, the fabric services engine 210a receives the FIP VLAN request message from the CNA 204a and, in response, sends an FIP VLAN notification message to the CNA 204a, as is known in the art of FCoE FIP systems. In an embodiment, the fabric services engine 210a may use a spoofed FCF MAC address that previously programmed into the source address of the FCoE/FC converter 210b as its source address when communicating with the CNAs at sub-block 504 and other blocks and sub-blocks of the method 300 (e.g., a source MAC address F0:4D:A2:00:DE:XX, where XX designates the FC port on the FC gateway 210). For example, the fabric services engine 210a may use the source MAC address F0:4D:A2:00:DE:01 for a first FIP VLAN notification message provided for a first FC port on the FC gateway 210, the source MAC address F0:4D:A2:00:DE:02 for a second FIP VLAN notification message provided for a second FC port on the FC gateway 210, and so on. In an example, the FIP VLAN notification message may include a destination MAC address (e.g., 00:01:02:03:04:05, the CNA ENode MAC address).

Block 500 then proceeds to sub-block 506 where the CNA sends an FIP discovery solicitation to the fabric services engine. In an embodiment, the CNA 204a sends an FIP discovery solicitation message to the fabric services engine 210a in response to receiving the FIP VLAN notification message at block 604. In an example, the FIP discovery solicitation message may include a source MAC address (e.g., 00:01:02:03:04:05, the CNA ENode MAC address) and a destination MAC address (e.g., 01:10:18:01:00:02, an all-FCF-MAC-addresses address). In an embodiment, the FIP discovery solicitation message sent by the CNA 204a may be directed (or redirected) to the fabric services engine 210a based on its FIP Ethertype.

Block 500 then proceeds to sub-block 508 where the fabric services engine sends an FIP discovery advertisement response to solicitation to the CNA. In an embodiment, the fabric services engine 210a receives the FIP discovery solicitation message from the CNA 204a and, in response, sends an FIP discovery advertisement response to solicitation message to the CNA 204a, as is known in the art of FCoE FIP systems. In an embodiment, the fabric services engine 210a may use the spoofed FCF MAC address (e.g., F0:4D:A2:00:DE:XX, discussed above) as the source address for the FIP discovery response to solicitation message, and a destination MAC address (e.g., 00:01:02:03:04:05, the CNA ENode MAC address).

Block 500 then proceeds to sub-block 510 where the CNA sends one of an FIP fabric login or an FIP fabric discovery (e.g., an FIP FDISC) to the fabric services engine in response to receiving the FIP discovery advertisement response to solicitation. In an embodiment, the CNA 204a may send one of an FIP fabric login message or an FIP fabric discovery message to the fabric services engine 210a depending on whether the communication is the first login communication by the server IHS to the fabric services engine 210a (in which case a FIP fabric login message is sent) or the communication is any subsequent login communication by the server IHS to the fabric service engine 210a (in which case a FIP fabric discovery message is sent). In an example, the FIP fabric login message/FIP fabric discovery message may include a source MAC address (e.g., 00:01:02:03:04:05, the CNA ENode MAC address) and a destination MAC address that is the spoofed FCF MAC address provided by the fabric services engine 210a (e.g., F0:4D:A2:00:DE:XX, discussed above). In an embodiment, the FIP fabric login message/FIP fabric discovery message sent by the CNA 204a may be directed (or redirected) to the fabric services engine 210a based on its FIP Ethertype.

Block 500 then proceeds to sub-block 512 where the fabric services engine sends an FCoE fabric discovery to the FCoE/FC converter. In an embodiment, the fabric services engine 210a receives the FIP fabric login message/FIP fabric discovery message from the CNA 204a and, in response, sends an FCoE fabric discovery message to the FCoE/FC converter 210b. In an embodiment, the fabric services engine 210a converts the FIP fabric login message/FIP fabric discovery message into an FCoE fabric discovery message by, for example, copying the FC frame payload from the FIP fabric login message/FIP fabric discovery message, converting the extended link service command code to fabric discovery if it is provided in a fabric login format, regenerating a FC cyclic redundancy check (CRC) or checksum, and wrapping the resulting package in an FCoE header and trailer. In an example, the FCoE fabric discovery message includes a source MAC address (e.g., 00:01:02:03:04:05, the CNA ENode MAC address) and a destination MAC address (e.g., 0E:FC:00:FF:FF:FE, which may include an FCoE "wrapped" login server WKA).

Block 500 then proceeds to sub-block 514 where the FCoE/FC converter sends an FC fabric discovery to the FC switch IHS. In an embodiment, the FCoE/FC converter 210b receives the FCoE fabric discovery message from the fabric services engine 210a and, in response, converts the FCoE fabric discovery message to an FC fabric discovery message that is then sent to the FC switch IHS 212. In an embodiment, the FCoE converter 210b converts the FCoE fabric discovery message to an FC fabric discovery message by stripping the FCoE header and trailer from the FCoE fabric discovery message. In an example, the FCoE fabric discovery message includes a SID (e.g., 00:00:00, an unassigned FC identification), and a DID (e.g., FF:FF:FE, the Login Server WKA).

Block 500 then proceeds to sub-block 516 where the FC Switch IHS sends an FC fabric discovery accept to the FCoE converter. In an embodiment, the FC switch IHS 212 receives the FC fabric discovery message from the FCoE/FC converter 210b and, if the FC fabric discovery message is valid, replies with an FC fabric discovery accept message (e.g., an FC FDISC ACC) that is sent to the FCoE converter 210b. FC switch IHS actions to determine whether an FC fabric discovery message is valid are known in the art and are not discussed in further detail here. In an example, the FC fabric discovery accept message may include the SID (e.g., FF:FF:FE, the Login Server WKA), and a DID (e.g., 03:01:01, the assigned FC identification for the CNA).

Block 500 then proceeds to sub-block 518 where the FCoE/FC converter sends an FCoE fabric discovery accept to the fabric services engine. In an embodiment, the FCoE/FC converter 210b receives the FC fabric discovery accept message from the FC switch IHS 212 and converts it to an FCoE fabric discovery accept message (e.g., an FCoE FDISC ACC) that is sent to the fabric services engine 210a. In an embodiment, the FCoE/FC converter 210b converts the FC fabric discovery accept message into an FCoE fabric discovery accept message by, for example, copying the FC frame payload from the FC fabric discovery accept message, and wrapping the FC frame payload in an FCoE header and trailer. In an example, the FCoE fabric discovery accept message may include the spoofed FCF MAC address used by the fabric services engine 210a (e.g., F0:4D:A2:00:DE:XX, discussed above) and a destination MAC address (e.g., 0E:FC:00:03:01:01, which may includes the CNA FPMA and a VN_Port MAC address) that are added by algorithmic replacement in the FCoE/FC converter 210b, as discussed above. In an embodiment, the FCoE fabric login accept message is trapped by hardware in the FC gateway 210 and sent the fabric services engine 210a.

Block 500 then proceeds to sub-block 520 where the fabric services engine sends one of an FIP fabric login accept or FIP fabric discovery accept to the CNA. In an embodiment, the fabric services engine 210a receives the FCoE fabric discovery accept message from the FCoE/FC converter 210b and, in response, may send one of an FIP fabric login accept message or an FIP fabric discovery accept message to the CNA 204a depending on whether a FIP fabric login message was received at block 510 (in which case a FIP fabric login accept message is sent) or a FIP fabric discovery message was received at block 510 (in which case a FIP fabric discovery accept message is sent. In an embodiment, the fabric services engine 210a converts the FCoE fabric discovery accept message into an FIP fabric login accept message/FIP fabric discovery accept message by, for example, copying the FC frame payload from the FCoE fabric discovery accept message, converting the extended link service command code to fabric login if it is provided in a fabric discovery format, regenerating a FC CRC or checksum, and wrapping the resulting package in an FCoE header and trailer. In an example, the FIP fabric login accept message/FIP fabric discovery accept message may include the spoofed FCF MAC address (e.g., F0:4D:A2:00:DE:XX, discussed above) as the source MAC address for the FIP fabric login accept message/FIP fabric discovery accept message and a destination MAC address (e.g., 00:01:02:03:04:05, the CNA ENode MAC address).

Block 500 of the method 300 may be performed for each server IHS 204, 206, and 208 by communicating with its respective CNA similarly as discussed above for the CNA 204a of the server IHS 204. Following sub-block 520 of block 500 of the method 300, each of the server IHSs are logged in through their associated converged network adapters 204a, 206a, and 208a, and the method 500 may proceed to block 600 where FC devices in the SAN are discovered. Furthermore, following block 520, the FCoE/FC converter 210b is programmed to convert FCoE communications from the server IHSs 204, 206, and 208 to FC communications provided to the FC SAN 216, and vice versa, e.g., using on the algorithmic replacement discussed above. In an embodiment, the FC devices are storage devices.

Figure 6:
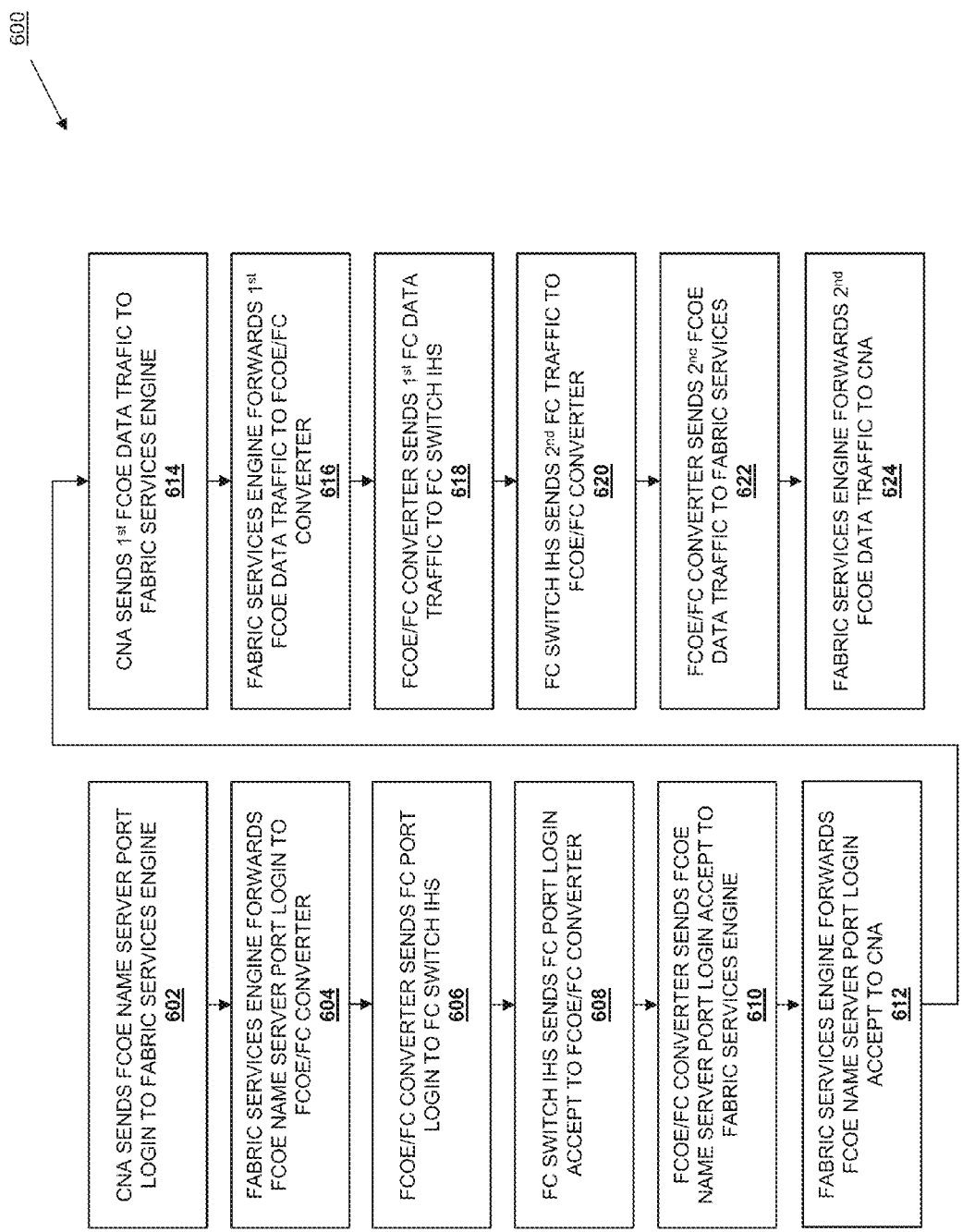
FIG. 6 is a flow chart illustrating an embodiment of a portion of the method for providing the Fibre Channel Gateway of FIG. 3.

Referring now to FIG. 6, an embodiment of block 600 of the method 300 in which FC devices in the SAN are discovered is illustrated. Block 600 begins with sub-block 602 where a CNA sends an FCoE name server port login to the fabric services engine. Using the server IHS 204 and its associated CNA 204a as an example, in an embodiment, the CNA 204a sends an FCoE name server port login message (e.g., an FCoE NS PLOGI) to the fabric services engine 210a in response to, for example, receiving the FIP fabric login accept message/FIP fabric discovery accept message. In an example, the FCoE name server port login message includes a source MAC address (e.g., 0E:FC:00:03:01:01, which may include the CNA FPMA and a VN_Port MAC address) and a destination MAC address that is the spoofed FCF MAC address used by the fabric services engine 210a (e.g., F0:4D:A2:00:DE:XX, discussed above).

Block 600 then proceeds to sub-block 604 where the fabric services engine forwards the FCoE name server port login to the FCoE/FC converter. In an embodiment, the fabric services engine 210a receives the FCoE name server port login message from the CNA 204a and, in response, forwards the FCoE name server port login message directly to the FCoE/FC converter 210b. Block 600 then proceeds to sub-block 606 where the FCoE/FC converter sends an FC port login to the FC switch IHS. In an embodiment, the FCoE/FC converter 210b receives the forwarded FCoE name server port login message from the fabric services engine 210a and, in response, converts the FCoE name server port login message to an FC port login message that is sent to the FC switch IHS 212 based on the programming of the FCoE/FC converter 210b as discussed above with reference to block 500. In an example, the FC port login message includes an SID (e.g., 03:01:01, the assigned FC identification for the CNA), and a DID (e.g. FF:FF:FE, the Name Server WKA).

Block 600 then proceeds to sub-block 608 where the FC switch IHS sends an FC port login accept to the FCoE converter 210b. In an embodiment, the FC switch IHS 212 receives the FC port login message from the FCoE/FC converter 210b and, if the FC port login message is accepted, replies with an FC port login accept (e.g., an FC PLOGI ACC) that is sent to the FCoE converter 210b. In an example, the FC port login accept may include the SID (e.g., FF:FF:FE, the Name Server WKA), and a DID (e.g., 03:01:01, the assigned FC identification for the CNA).

Block 600 then proceeds to sub-block 610 where the FCoE/FC converter sends an FCoE name server port login accept to the fabric services engine. In an embodiment, the FCoE/FC converter 210b receives the FC port login accept message from the FC switch IHS 212 and, in response, converts the FC port login accept message based on the programming of the FCoE/FC converter 210b as discussed above with reference to block 500 to an FCoE name server port login accept message that is sent to the fabric services engine 210a. In an example, the FCoE name server port login accept message uses the spoofed FCF MAC address (e.g., F0:4D:A2:00:DE:XX, discussed above) as the source address and a destination address (e.g., 0E:FC:00:03:01:01, which may includes the CNA FPMA and a VN_Port MAC address) that are added by algorithmic replacement in the FCoE/FC converter 210b, as discussed above.

Block 600 then proceeds to sub-block 612 where the fabric services engine forwards the FCoE name server port login accept to the CNA. In an embodiment, the fabric services engine 210a receives the FCoE name server port login accept message from the FCoE/FC converter 201a and, in response, forwards the FCoE name server port login accept message directly to the CNA 204a. Following the forwarding of the FCoE name server port login accept message to the CNA 204a, one of skill in the art in possession of the present disclosure will recognize that other fabric services commands not explicitly discussed herein may be sent between the CNa 204a and the FC SAN 216 through the FCoE/FC converter 210b while remaining within the scope of the present disclosure.

Block 600 then proceeds to sub-block 614 where the CNA sends first FCoE data traffic to the fabric services engine. In an embodiment, the CNA 204a sends first FCoE data traffic to the fabric services engine 210a. In an example, the first FCoE data traffic includes a source address (e.g., 0E:FC:00: 03:01:01, which may include the CNA FPMA and a VN_Port MAC address) and a destination address that is the spoofed FCF MAC address used by the fabric services engine 210a (e.g., F0:4D:A2:00:DE:XX, discussed above).

Block 600 then proceeds to sub-block 616 where the fabric services engine forwards the first FCoE data traffic to the FCoE/FC converter. In an embodiment, the fabric services engine 210a receives the first FCoE data traffic from the CNA 204a and, in response, forwards the first FCoE data traffic directly to the FCoE/FC converter 210b. Block 600 then proceeds to sub-block 618 where the FCoE/FC converter sends first FC data traffic to the FC switch IHS. In an embodiment, the FCoE/FC converter 210b receives the first FCoE data traffic from the fabric services engine 210a and, in response, converts the first FCoE data traffic to first FC data traffic based on the programming of the FCoE/FC converter 210b as discussed above with reference to block 500, and that first FC data traffic is sent to the FC switch IHS 212. In an example, the first FC data traffic includes an SID (e.g., 03:01:01, the assigned FC identification for the CNA), and a DID (e.g. 03:00:00, the FC identification of a target (e.g., an FC device 214 coupled to the FC switch IHS 212)).

Block 600 then proceeds to sub-block 618 where the FC switch IHS sends second FC data traffic to the FCoE converter 210b. In an embodiment, the FC switch IHS 212 receives the first FC data traffic from the FCoE/FC converter 210b, forwards that first FC data traffic to the destination FC device 214 E.g., based on the DID in the first FC data traffic), and then receives second FC data traffic from that FC device 214 that is sent to the FCoE converter 210b. In an example, the second FC data traffic may include an SID (e.g., 03:00: 00, the assigned FC identification for the CNA), and a DID (e.g. 03:01:01, the FC identification of a target).

Block 600 then proceeds to sub-block 620 where the FCoE/FC converter sends second FCoE data traffic to the fabric services engine. In an embodiment, the FCoE/FC converter 210b receives the second FC data traffic from the FC switch IHS 212 and, in response, converts the second FC data traffic to second FCoE data traffic based on the programming of the FCoE/FC converter 210b as discussed above with reference to block 500, and that second FCoE data traffic is sent to the fabric services engine 210a. In an embodiment, the second FCoE data traffic includes the spoofed FCF MAC address used by the fabric services engine 210a (e.g., F0:4D:A2:00:DE:XX, discussed above) as the source MAC address and a destination MAC address (e.g., 0E:FC:00:03:01:01, which may include includes the CNA FPMA and a VN_Port MAC address) that are added by algorithmic replacement in the FCoE/FC converter 210b, as discussed above.

Block 600 then proceeds to sub-block 624 where the fabric services engine forwards the second FCoE data traffic to the CNA. In an embodiment, the fabric services engine 210a receives the second FCoE data traffic from the FCoE/ FC converter 201a and, in response, forwards the second FCoE data traffic directly to the CNA 204a.

Figure 7A:
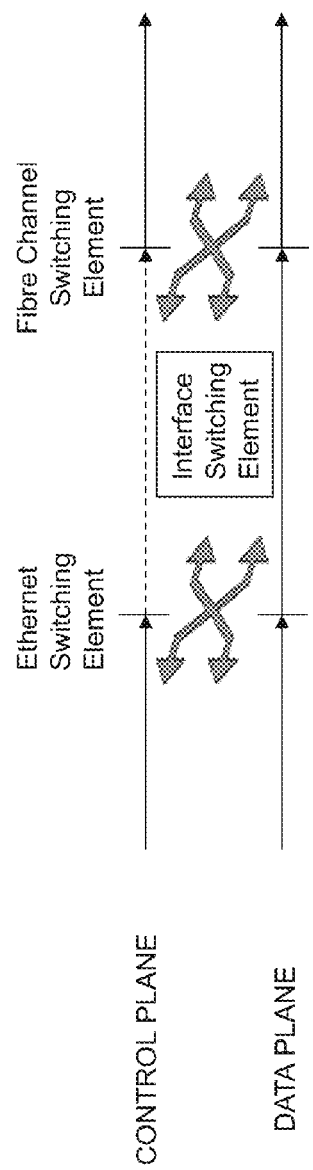
FIG. 7a is a schematic view of the handling of the control plane and the data plane in prior art systems and methods.
Figure 7B:
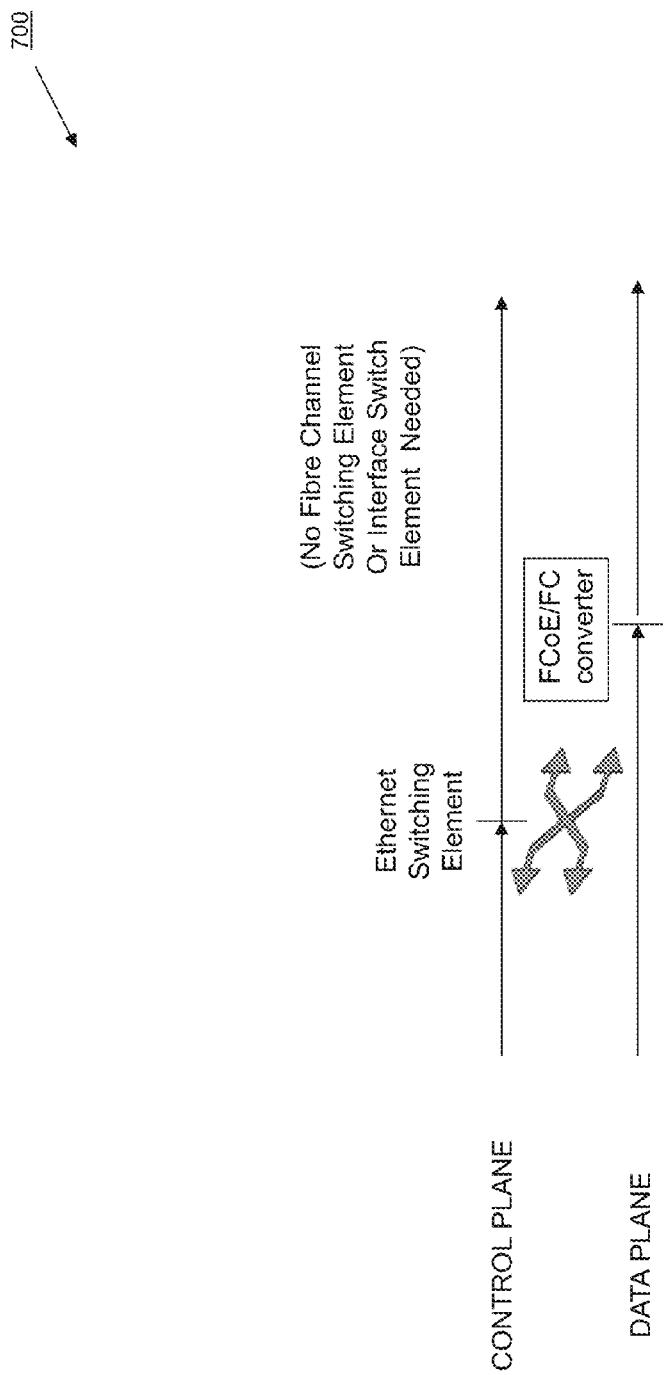
FIG. 7b is a schematic view of the handling of the control plane and the data plane in the systems and methods of the present disclosure.

One of skill in the art will appreciate how blocks 400 and 500 of the method 300 provide for the processing of the control plane, while block 600 of the method 300 provides for the processing of the data plane. Referring to FIGS. 7a and 7b, the some differences between prior art methods for connecting server IHSs that use FCoE communications to SAN's that use FC communications and the systems and methods of the present disclosure are illustrated. FIG. 7a illustrates how, in prior art methods, the control plane and the data plane go through the same converged switch and FCF. FIG. 7b illustrates how, in the systems and methods of the present disclosure, the control plane is utilized to program an FCoE/FC converter to perform conversions such that a relatively simpler, faster, and cheaper switch chip (i.e., compared to the conventional systems discussed above) may be utilized for data processing on the data plane.

Thus, systems and methods have been described that provide a less complex and less expensive FC gateway that is configured to establish communication with an FC SAN, provide for the logging in of one or more server IHSs, and discover FC devices in the SAN so that the server IHSs may communicate with those FC devices. In some embodiments, the FC gateway provides an FC NPIV gateway in which all FIP traffic (e.g., VLAN request/notification, discovery solicitation/advertisement, FIP fabric login/fabric discovery, accepts, etc.) from server IHSs communicating using FCoE is handled by a fabric services engine that operates on the FC gateway and that also handles, for example, FIP FCoE link maintenance (e.g., FKA, discovery adjustment, CVL, FIP LOGO, etc.) In an embodiment, all FCoE communications may be passed through the FC NPIV gateway and have their FCoE headers stripped off on the way to the FCoE/FC encapsulator/decapsulator (i.e., converter) such that native FC communications are sent on to an upstream NPIV port on the FC SAN fabric. All incoming FC communications may be wrapped in an FCoE header by the fabric services engine and handled by a processing system (e.g., an Ethernet switch chip). In an embodiment, all FC fabric services (e.g., name server, management server, zoning, etc.) may be handled in the native FC SAN upstream from the FC gateway.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel gateway, comprising:
   a Fibre Channel over Ethernet/Fibre Channel (FCoE/FC) converter physical layer (PHY) chip that is programmed with a spoofed Fibre Channel Forwarding (FCF) Media Access Control (MAC) address;
   a processing system that is coupled to the FCoE/FC converter PHY chip;
   a memory system that is coupled to the processing system and that includes instructions that, when executed by the processing system, cause the processing system to provide a fabric services engine that is configured to:
   establish communication with an FC switch IHS that is directly connected to the FCoE/FC converter PHY chip;
   receive one of an FCoE Initialization Protocol (FIP) fabric login message and a FIP fabric discovery message that includes the spoofed FCF MAC address as its destination address from a server IHS and, in response, provide an FCoE fabric discovery message to the FCoE/FC converter PHY chip, wherein the FCoE/FC converter PHY chip converts the FCoE fabric discovery message to an FC fabric discovery message that is provided to the FC switch IHS; and receive an FCoE fabric discovery accept message that includes the spoofed FCF MAC address as its source address from the FCoE/FC converter PHY chip and, in response, provide one of a FIP fabric login accept message and a FIP fabric discovery accept message that includes the spoofed FCF MAC address as its source address to the server IHS, wherein the FCoE/FC converter PHY chip converts an FC fabric discovery accept message that is received from the FC switch IHS to the FCoE fabric discovery accept message that is received by the fabric services engine.

2. The Fibre Channel gateway of claim 1, wherein the instructions that, when executed by the processing system, cause the processing system to provide the fabric services engine that is configured to establish communication with the FC switch IHS further cause the fabric services engine to:

send an FCoE fabric login message to the FCoE/FC converter PHY chip such that the FCoE/FC converter PHY chip converts the FCoE fabric login message to an FC fabric login message that is provided to the FC switch IHS; and receive an FCoE fabric login accept message from the FCoE converter, PHY chip, wherein the FCoE/FC converter PHY chip converts an FC fabric login accept message that is received from the FC switch IHS to the FCoE fabric login accept message that is received by the fabric services engine.

3. The Fibre Channel gateway of claim 1, wherein the instructions, when executed by the processing system, cause the processing system to provide the fabric services engine that is further configured to:

receive a FIP Virtual Local Area Network (VLAN) request message from the server IHS and, in response, provide a FIP VLAN notification message to the server IHS; and receive a FIP discovery solicitation message from the server IHS and, in response, provide a FIP discovery response to solicitation message to the server IHS.

4. The Fibre Channel gateway of claim 1, wherein the instructions, when executed by the processing system, cause the processing system to provide the fabric services engine that is further configured to:

receive an FCoE name server port login message from the server IHS and, in response, forward the FCoE name server port login message to the FCoE/FC converter PHY chip such that the FCoE/FC converter PHY chip converts the FCoE name server port login message to an FC port login message that is provided to the FC switch IHS; and forward an FCoE name server port login accept message to the server IHS that was received from the FCoE/FC converter PHY chip, wherein the FCoE/FC converter PHY chip converts an FC port login accept message that was received from the FC switch IHS to the FCoE name server port login accept message that is received by the fabric services engine.

5. The Fibre Channel gateway of claim 1, wherein the instructions, when executed by the processing system, cause the processing system to provide the fabric services engine that is further configured to:

receive first FCoE data traffic from the server IHS and, in response, forward the first FCoE data traffic to the FCoE/FC converter PHY chip such that the FCoE/FC converter PHY chip converts the first FCoE data traffic to first FC data traffic that is provided to the FC switch IHS; and forward second FCoE data traffic to the server IHS that was received from the FCoE/FC converter PHY chip, wherein the FCoE/FC converter PHY chip converts second FC data traffic that was received from the FC switch IHS to the second FCoE data traffic that is received by the fabric services engine.

6. The Fibre Channel gateway of claim 1, wherein the fabric services engine includes at least one Well Known Addresses (WKA), and wherein the fabric services engine is configured to:

access the at least one WKA; and
use the WKA to communicate with the FC switch IHS.

7. An information handling system (IHS) network, comprising:

a server IHS;
a Fibre Channel (FC) switch IHS; and
a FC gateway that is directly connected to each of the server IHS and the FC switch IHS, wherein the FC gateway includes a physical layer (PHY) chip that is programmed with a spoofed Fibre Channel Forwarding (FCF) Media Access Control (MAC) address, and wherein the FC gateway is configured to:

establish communication with the FC switch IHS;
receive one of an FCoE Initialization Protocol (FIP) fabric login message and a FIP fabric discovery message that includes the spoofed FCF MAC address as its destination address from the server IHS;
generate an FCoE fabric discovery message;
use a PHY chip to convert the FCoE fabric discovery message to an FC fabric discovery message;
provide the FC fabric discovery message to the FC switch IHS;
receive a FC fabric discovery accept message from the FC switch IHS;
use the PHY chip to convert the FC fabric discovery accept message to an FCoE fabric discovery accept message that includes the spoofed FCF MAC address at its source address; and
provide one of a FIP fabric login accept message and a FIP fabric discovery accept message that includes the spoofed FCF MAC address as its source address to the server IHS.

8. The IHS network of claim 7, wherein the FC gateway is configured to establish communication with the FC switch IHS by:

providing an FCoE fabric login message and converting the FCoE fabric login message to an FC fabric login message that is provided to the FC switch IHS; and
using the PHY chip to convert an FC fabric login accept message that is received from the FC switch IHS to an FCoE fabric login accept message.

9. The IHS network of claim 7, wherein the FC gateway is configured to:

receive a FIP Virtual Local Area Network (VLAN) request message from the server IHS and, in response, provide a FIP VLAN notification message to the server IHS; and
receive a FIP discovery solicitation message from the server IHS and, in response, provide a FIP discovery response to solicitation message to the server IHS.

10. The IHS network of claim 7, wherein the FC gateway is configured to:
receive an FCoE name server port login message from the server IHS and convert the FCoE name server port login message to an FC port login message that is provided to the FC switch IHS; and
use the PHY chip to convert an FC port login accept message that was received from the FC switch IHS to an FCoE name server port login accept message that is provided to the server IHS.

11. The IHS network of claim 7, wherein the FC gateway is configured to:
receive first FCoE data traffic from the server IHS and convert the first FCoE data traffic to first FC data traffic that is provided to the FC switch IHS; and
use the PHY chip to convert second FC data traffic that is received from the FC switch IHS to second FCoE data traffic that is provided to the server IHS.

12. A method for providing a Fibre Channel gateway, comprising:
establishing communication with an FC switch IHS that is directly connected to an FCoE/FC converter physical layer (PHY) chip that is programmed with a spoofed Fibre Channel Forwarding (FCF) Media Access Control (MAC) address;
receiving one of an FCoE Initialization Protocol (FIP) fabric login message and a FIP fabric discovery message that includes the spoofed FCF MAC address as its destination address from a server IHS and, in response, providing an FCoE fabric discovery message to the FCoE/FC converter PHY chip, wherein the FCoE/FC converter PHY chip converts the FCoE fabric discovery message to an FC fabric discovery message that is provided to the FC switch IHS; and
receiving an FCoE fabric discovery accept message that includes the spoofed FCF MAC address as its source address from the FCoE/FC converter PHY chip and, in response, providing one of a FIP fabric login accept message and a FIP fabric discovery accept message that includes the spoofed FCF MAC address as its source address to the server IHS, wherein the FCoE/FC converter PHY chip converts an FC fabric discovery accept message that is received from the FC switch IHS to the FCoE fabric discovery accept message.

13. The method of claim 12, wherein the establishing communications further comprises:
sending an FCoE fabric login message to the FCoE/FC converter PHY chip such that the FCoE/FC converter PHY chip converts the FCoE fabric login message to an FC fabric login message that is provided to the FC switch IHS; and
receiving an FCoE fabric login accept message from the FCoE converter PHY chip, wherein the FCoE/FC converter PHY chip converts an FC fabric login accept message that is received from the FC switch IHS to the FCoE fabric login accept message.

14. The method of claim 12, further comprising:
receiving a FIP Virtual Local Area Network (VLAN) request message from the server IHS and, in response, provide a FIP VLAN notification message to the server IHS; and
receiving a FIP discovery solicitation message from the server IHS and, in response, provide a FIP discovery response to solicitation message to the server IHS.

15. The method of claim 12, further comprising:
receiving an FCoE name server port login message from the server IHS and, in response, forwarding the FCoE name server port login message to the FCoE/FC converter PHY chip such that the FCoE/FC converter PHY chip converts the FCoE name server port login message to an FC port login message that is provided to the FC switch IHS; and
forwarding an FCoE name server port login accept message to the server IHS that was received from the FCoE/FC converter PHY chip, wherein the FCoE/FC converter PHY chip converts an FC port login accept message that was received from the FC switch IHS to the FCoE name server port login accept message.

16. The method of claim 12, further comprising:
receiving first FCoE data traffic from the server IHS and, in response, forwarding the first FCoE data traffic to the FCoE/FC converter PHY chip such that the FCoE/FC converter PHY chip converts the first FCoE data traffic to first FC data traffic that is provided to the FC switch IHS; and
forwarding second FCoE data traffic to the server IHS that was received from the FCoE/FC converter PHY chip, wherein the FCoE/FC converter PHY chip converts second FC data traffic that was received from the FC switch IHS to the second FCoE data traffic.

17. The method of claim 12, further comprising:
accessing a Well Known Address (WKA); and
using the WKA to communicate with the FC switch IHS.

* * * * *

UNITED STATES PATENT AND TRADEMARK OFFICE
CERTIFICATE OF CORRECTION

| | |
|---|---|
| PATENT NO. | : 9,667,753 B2 |
| APPLICATION NO. | : 14/295999 |
| DATED | : May 30, 2017 |
| INVENTOR(S) | : Varble et al. |

Page 1 of 1

It is certified that error appears in the above-identified patent and that said Letters Patent is hereby corrected as shown below:

On the Title Page

In the Abstract, "a Fiber Channel (FC)" should read --a Fibre Channel (FC)--;

In the Drawings

Sheet 1 should be labeled --FIG. 1--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*